(12) United States Patent
Gaillard et al.

(10) Patent No.: US 10,673,221 B2
(45) Date of Patent: Jun. 2, 2020

(54) STORAGE FOR ELECTRIC CABLE

(71) Applicant: RENAULT S.A.S., Boulogne-Billancourt (FR)

(72) Inventors: Frédéric Gaillard, Voiron (FR); Daniel Chatroux, Teche (FR); Olivier Guillermin, Toussieu (FR); Daniel Mermin, Sassenage (FR); Jérémy Dupont, Bourgoin-Jallieu (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 283 days.

(21) Appl. No.: 15/558,820

(22) PCT Filed: Mar. 16, 2016

(86) PCT No.: PCT/FR2016/050589
§ 371 (c)(1),
(2) Date: Sep. 15, 2017

(87) PCT Pub. No.: WO2016/146948
PCT Pub. Date: Sep. 22, 2016

(65) Prior Publication Data
US 2018/0083432 A1 Mar. 22, 2018

(30) Foreign Application Priority Data
Mar. 17, 2015 (FR) ...................................... 15 52198

(51) Int. Cl.
*H02G 11/02* (2006.01)
*B65H 75/36* (2006.01)
*B60L 53/31* (2019.01)
*B60L 53/14* (2019.01)
(Continued)

(52) U.S. Cl.
CPC .............. *H02G 11/02* (2013.01); *B60L 53/14* (2019.02); *B60L 53/18* (2019.02); *B60L 53/30* (2019.02); *B60L 53/31* (2019.02); *B65H 75/368* (2013.01); *B65H 2701/34* (2013.01); *B65H 2701/391* (2013.01); *Y02T 10/7005* (2013.01);
(Continued)

(58) Field of Classification Search
CPC ............................... H02G 11/00; H02G 11/02
See application file for complete search history.

(56) References Cited

U.S. PATENT DOCUMENTS

| | | | |
|---|---|---|---|
| 6,216,834 B1 * | 4/2001 | Steinhovden | B65H 75/368 191/12 R |
| 8,985,541 B2 * | 3/2015 | Horvath | B65H 75/446 242/379.2 |
| 2009/0173868 A1 * | 7/2009 | Fawcett | A47F 7/024 248/551 |

FOREIGN PATENT DOCUMENTS

| | | |
|---|---|---|
| JP | 2014110655 A | 6/2014 |
| JP | 2014230298 A | 12/2014 |
| WO | 2012/043163 A1 | 4/2012 |

OTHER PUBLICATIONS

Translation of the Written Opinion of the International Seaching Authority; International Application No. PCT/FR2016/050589, 5 pages.
(Continued)

*Primary Examiner* — Robert J McCarry, Jr.
(74) *Attorney, Agent, or Firm* — Moreno IP Law LLC

(57) ABSTRACT

The invention concerns an electrical connection system, comprising a helical electrical cable (6) having a spring effect and a device (7) for storing the cable, comprising at least one first pulley (74, 73) for guiding the cable.

13 Claims, 5 Drawing Sheets

(51) Int. Cl.
*B60L 53/18* (2019.01)
*B60L 53/30* (2019.01)

(52) U.S. Cl.
CPC .......... *Y02T 10/7088* (2013.01); *Y02T 90/121* (2013.01); *Y02T 90/128* (2013.01); *Y02T 90/14* (2013.01)

(56) References Cited

OTHER PUBLICATIONS

PCT International Search Report; International Application No. PCT/FR2016/050589 dated Jun. 6, 2016, 2 pages.

* cited by examiner

STORAGE FOR ELECTRIC CABLE

The present description generally relates to electric connection systems. The present description more particularly relates to an electric cable storage device and more particularly applies to an electric connection system for the charging of a motor vehicle battery or the like.

DISCUSSION OF THE RELATED ART

The charging of the battery or the batteries of a motor vehicle is generally performed by connecting a battery charger contained in the vehicle to an electric power source, for example, an electric power distribution network or a photovoltaic facility. To achieve this, a cable connects the charger to an electrically-powered charging station.

When the cable is not in use, that is, when it connects no charger to the network, it needs to be stored. For this purpose, either a cable reel, or a box where the cable is placed loosely or manually wound, be it on the vehicle side or on the charging station side.

To decrease the space occupied by the cable, it has already been provided, on the vehicle side, to use a helical cable which forms a cylinder when it is not stretched.

There is a need to improve electric cable storage devices, particularly for electric connection systems applied to the charging of electric vehicles.

Document US-A-2009/173868 describes a theft-prevention device used to display an article, comprising a device for receiving a helical cable fastened to the article. The cable is stored flat.

SUMMARY

An embodiment aims at overcoming all or part of the disadvantages of current electric cable storage devices.

An embodiment aims at overcoming all or part of the disadvantages of current electric connection systems for the charging of electric vehicles.

An embodiment provides an electric cable storage device particularly adapted to a helical cable.

An embodiment provides a solution particularly adapted to a fixed charging station.

An embodiment provides a system particularly capable of storing a cable of several meters.

An embodiment provides a system which is particularly simple to use.

An embodiment provides an automatic system requiring no power input external to the system to store the cable.

Thus, an embodiment provides an electronic connection system comprising:

a helical electric cable having a spring effect; and a cable storage device, defining a cable housing space and comprising at least one first cable guiding pulley, the first pulley being arranged so that, on storage of the cable in the device, the cable is both pulled back by its spring effect and pulled down by the weight of the cable portion present under the first pulley.

According to an embodiment, the first pulley is rotatably mobile around an approximately horizontal shaft.

According to an embodiment, the first pulley comprises an external peripheral groove having a width greater than the external diameter of the cable helix.

According to an embodiment, the first pulley and/or the storage device pivot around a vertical axis.

According to an embodiment:

a first end of the cable is fixed with respect to the storage device; and a second end of the cable is free and comes out of a case of the storage device through an opening approximately tangentially to the first pulley.

According to an embodiment, the system comprises at least one second pulley, rotatably mobile around an approximately horizontal shaft, the shaft of the first pulley being higher than the shaft of the second pulley and the pulleys rotating, driven by the cable, in opposite or identical directions.

According to an embodiment, the vertical position of the fixed end of the cable is between the shafts of the two pulleys.

According to an embodiment, the second pulley is approximately vertically mobile in translation.

According to an embodiment, a spring pulls the second pulley back downwards.

According to an embodiment, the system comprises a plurality of first pulleys and a plurality of second pulleys, the cable successively running from a first pulley to a second pulley from its first fixed end to the opening.

According to an embodiment, the cable has a deployed length in the range from approximately 4 meters to approximately 9 meters and a relaxed length in the range from approximately 0.8 meter to approximately 1.5 meters.

According to an embodiment, the cable has a cross-section in the range from approximately 0.5 $cm^2$ to approximately 1.5 $cm^2$, the diameter of the helix formed by the relaxed cable being in the range from approximately 4 cm to approximately 8 cm.

According to an embodiment, the system is intended for motor vehicle battery charging.

BRIEF DESCRIPTION OF THE DRAWINGS

The foregoing and other features and advantages will be discussed in detail in the following non-limiting description of dedicated embodiments in connection with the accompanying drawings, among which.

DETAILED DESCRIPTION OF THE PRESENT EMBODIMENTS

Figure 1A:
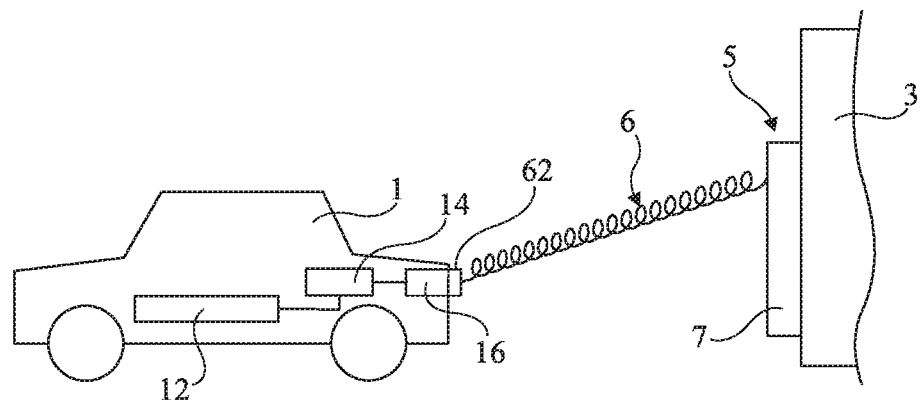
FIGS. 1A and 1B very schematically show an embodiment of an electric connection system for charging a battery of a motor vehicle and such a vehicle, respectively with a deployed cable and a stored cable.

The same elements have been designated with the same reference numerals in the different drawings. For clarity, only those elements which are useful to the understanding of the described embodiments have been shown and will be detailed. In particular, the management of the charging of a vehicle battery has not been detailed, the described embodiments being compatible with usual solutions. Further, the forming of the cable has not been detailed otherwise than for the needs of the present description, the described embodiments being, for the rest, here again compatible with usual helical or spiral cables.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings or to a connection system in a normal position of use. Unless otherwise specified, expressions "approximately", "substantially", and "in the order of" mean to within 10%, preferably to within 5%.

The present description refers to an example of application to the storage of an electric cable intended for the charging of an electric vehicle. It should however be noted that the embodiments of the cable storage device which will be described more generally apply to the storage of any electric cable for which similar problems are posed.

In the following embodiments, it is provided to use a helical or spiral cable. As compared with a straight cable (neither spiral, nor helical), this enables to benefit from a spring effect of the cable towards a relaxed position where it is stacked, such a spring effect being caused by the stretching of the cable for the connection thereof. Further, a helical cable decreases thermal issues due to heat dissipation during the cable use.

Conversely to usual connection systems, where such a cable is housed in a trunk of the vehicle, most often loosely, a device for automatically storing the cable in a case while easing its extraction from the case for the connection to a vehicle is here provided.

The described embodiments apply to the manufacturing of a storage device on the side of the power supply facility, that is, on the charging station side, be it in a public space or at the user's place of residence.

Among the constraints generated by the application to the charging of an electric vehicle, the following should be noted:

a large cable length, that is, a length capable of reaching some ten meters, which generates a non-negligible weight for the cable, which usually poses problems to the user;

the desire for a so-called fast charging, that is, with a current of several tens of amperes, requiring a conductor cross-section of several square millimeters (typically in the order of 6 mm2), taking part in increasing the cable weight;

a need to store the cable so that it does not get tangled to ease subsequent uses thereof;

a need for a low-bulk system.

Figure 1B:
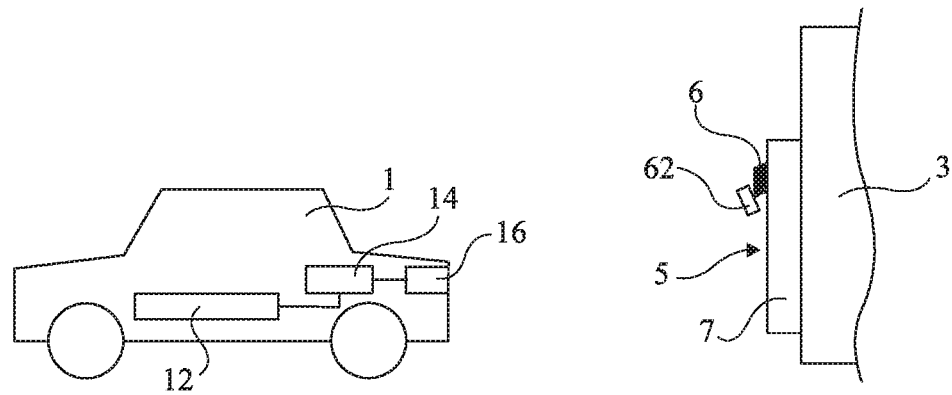

FIGS. 1A and 1B very schematically show an embodiment of an electric connection system for charging a battery of a motor vehicle and such a vehicle, respectively with a deployed cable and with a stored cable.

An electric or hybrid vehicle 1 comprises one or a plurality of batteries 12 intended to supply it with the power necessary to propel it. Such batteries 12 are connected to one or a plurality of charge management and control devices 14 (chargers) intended to control the charge of batteries when they are connected to an electric power supply facility 3. Facility 3 may be a public charging station of gas station type, a domestic installation (for example, at the vehicle user's place or residence), etc.

On the side of facility 3, a system 5 of electric connection of the power source to charger 14 of vehicle 14 is provided. Connection system 5 comprises a helical electric cable 6 and a cable storage device 7. A first end (not shown in FIGS. 1A and 1B) of the cable is connected, in practice permanently, to facility 3. A second (free) end of cable 6 ends with a plug (or socket) 62 of connection to a socket (or plug) 16 on the side of charger 14.

During a charging of vehicle 1 (FIG. 1A), cable 6 is stretched and taken out, at least partially, of device 7. Between two charging operations (FIG. 1B), cable 6 is stored in device 7.

Figure 2:
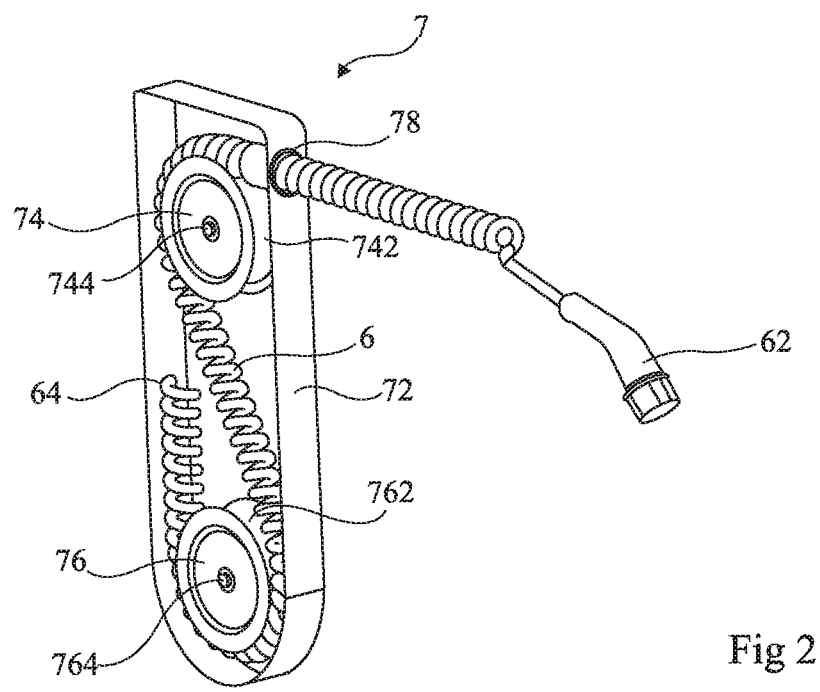
FIG. 2 is a perspective view of an embodiment of an electric connection system illustrating the inside of a cable storage device.

FIG. 2 is a perspective view of an embodiment of an electric connection system 5 illustrating the inside of device 7 for storing cable 6.

In this embodiment, device 7 comprises:

a case 72 intended to house cable 6 when the latter is to be stored; and two pulleys, respectively upper 74 and lower 76, for guiding cable 6.

Each pulley 74, 76 is supported by an approximately horizontal shaft, and comprises an external peripheral groove 742, 762. The dimensions of grooves 742 and 762 are selected according to the diameter of the spiral of cable 6 in order to guide it with the minimum friction. Shafts 744 and 764 of the two pulleys are approximately horizontal, preferably horizontal, and are, in the shown example, approximately vertically aligned. The pulleys freely rotate around their respective shafts.

One end 64 of cable 6, opposite to that receiving plug 62, is fixed and connected to power supply facility 3. From this end, cable 6 runs under lower pulley 76, rises slantways towards the opposite edge of upper pulley 74, runs over pulley 74, and comes out through an opening 78 provided in case 72, preferably, in its edge. Thus, pulleys 74 and 76 rotate in opposite directions. In the orientation of FIG. 2, when the cable is unreeled, pulley 74 rotates clockwise while pulley 76 rotates counterclockwise.

Figure 3A:
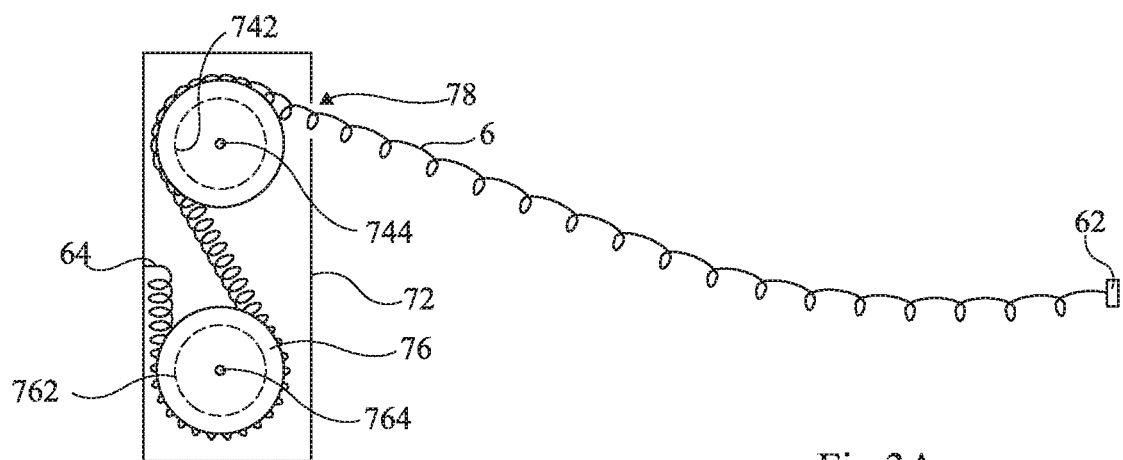
FIGS. 3A, 3B, and 3C are simplified views illustrating the operation of the connection system of FIG. 2.
Figure 3B:
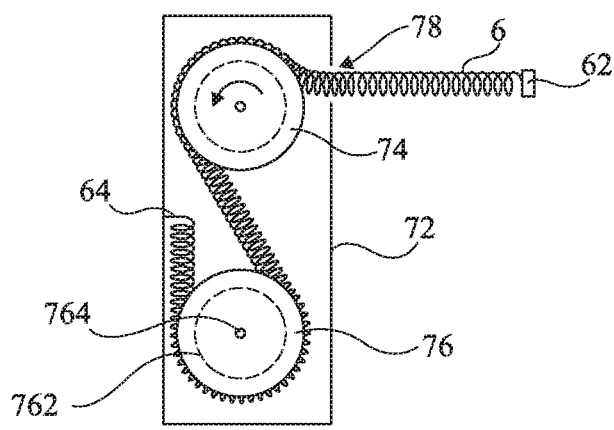
Figure 3C:
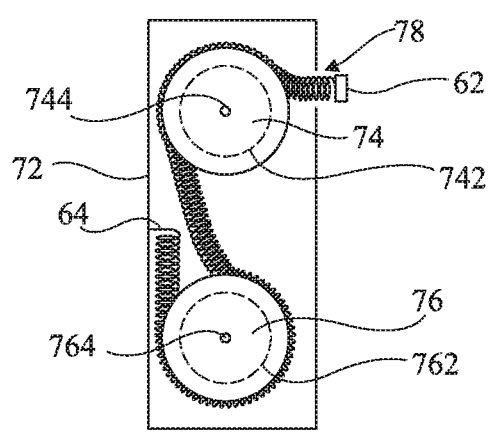

FIGS. 3A, 3B, and 3C are simplified views illustrating the operation of the connection system of FIG. 2. FIG. 3A illustrates the case where the cable is unreeled to be connected to the charger of a vehicle. FIG. 3B illustrates an intermediate storage case. FIG. 3C illustrates the situation where cable 6 is stored.

Starting from a position such as illustrated in FIG. 3A where cable 6 is stretched, when the external traction on cable 6 is released (when it is disconnected from the vehicle), the spring effect of the portion of cable 6 which has remained within case 72 starts pulling in the portion of cable 6 which is outside. Pulley 74 is then rotated counterclockwise and pulley 76 is rotated clockwise.

The movement initiated by the spring effect due to the helical character of cable 6 is amplified when the quantity of cable 6 inside of case 72 becomes sufficient to, due to its weight, pull in the rest of the cable. FIG. 3B illustrates an intermediate position where a portion of cable 6 is stored while a portion remains outside.

At the end of the movement, the spring effect linked to the helical character enables to store the free end of cable 6. As illustrated in FIG. 3C, according to the length of cable 6, its section between pulleys 74 and 76 may be close to the vertical direction. It can be considered that the interval between pulleys 74 and 76 defines the area of storage of cable 6.

It should be noted that the mass of pulleys 74 and 76 also takes part in the driving effect, due to the inertia that they acquire during their rotation, which eases the end of the storage.

During the unreeling of cable 6 for the use thereof, that is, an outward traction exerted by pulling on plug 62, the traction need recedes when the quantity of cable outside of device 7 becomes sufficient for the weight of cable 6 to take part in the pulling out of the cable portion which has remained inside. The combination of the spring effect of the cable with the mass effect of the cable stored in the housing enables to decrease traction efforts on socket 16 and plug 62 during the entire vehicle charge phase, as compared with a solution where the entire storage is achieved by means of a spring. The reliability is thus increased and risks of breakage of the plug or of the socket are minimized.

Successive combined effects of traction by the spring effect of the cable and of traction by the cable weight (located under pulley 74 during the storage and outside during the unwinding) can thus be observed. For example, if only a small portion of cable 6 is taken out of device 7, during the storage thereof, it is mainly pulled in by the mass effect of the more significant portion of cable 6 which has remained inside. However, if the quantity of cable which has been taken out is significant (the majority thereof), the spring effect of the cable initiates the movement.

The dimensions of case 72 are selected to avoid for the cable not to find the grooves of the pulleys and to come out of the grooves when the pulleys are rotating. For example, whether the bottom of cable 6 comes out of the groove of pulley 76 when it is stored, that is, it falls at the bottom of the package as illustrated in FIG. 3C, matters little provided that when it is pulled back out, during a new unreeling of the cable, it finds groove 762 again. To achieve this, it is sufficient, as an example, to limit the case thickness so that the cable systematically finds the way to groove 762 again.

The length of cable 6 between the catching point or inner end 64 of the cable and pulley 76 enables to increase the useful spring length enabling to pull back cable 6 when it is totally unreeled, as in the case of FIG. 3A.

The size of opening 78 is selected to limit (or to avoid) frictions of cable 6, whatever the position thereof.

More generally, it is ascertained to limit as much as possible frictions within device 7 to make the most of the spring and mass effects of cable 6.

Figure 4:
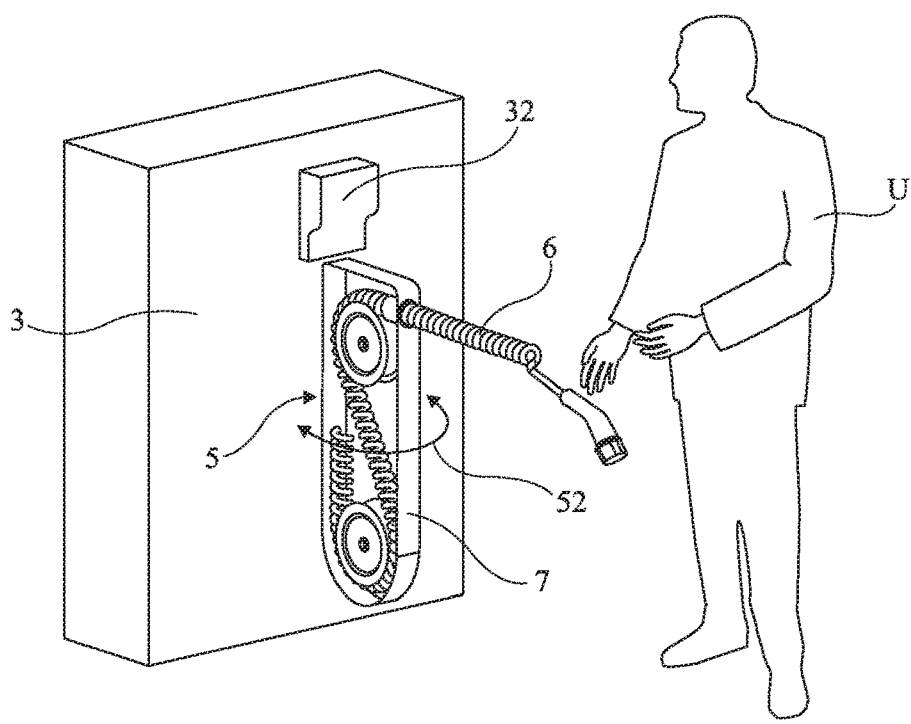
FIG. 4 is a simplified perspective view of an embodiment of a connection system in an example of environment.

FIG. 4 is a simplified perspective view of an embodiment of a connection system 5 in an example of environment. An application to the charging of a motor vehicle requiring a cable 6 of several meters is assumed.

Device 7 for storing cable 6 is, as in FIG. 2, shown open. In practice, it is closed. Further, a user U is symbolized in FIG. 4.

The case of a power supply facility 3 of charging station type is assumed. The inner end (not shown in FIG. 4) of cable 6 is connected to an electric power management device 32. As illustrated in FIG. 2, storage device 7 is placed approximately vertically, preferably vertically, cable outlet 78 being at the top. Preferably, case 72 is pivotally assembled around an approximately vertical axis, preferably vertical, which enables on the one hand to direct outlet 78 towards the vehicle to be charged, thus limiting the cable friction, and on the other hand to swing the system against the wall supporting the facility to store it when it is not being used.

According to an alternative embodiment, the pivoting articulation around a vertical axis is internal to storage device 7. In this case, a pivotal assembly of upper pulley 74 alone, of lower pulley 76 alone, or of both, may be provided.

In this example, the dimensions of device 7 (which depend, among others, on the diameter of the cable and on the diameter of the spirals when it is stored) are the following:

Height in the range from 40 cm to 1 m;
Width in the range from 20 cm to 50 cm;
Thickness in the range from 5 cm to 12 cm.

Preferably, the length of cable 6 is selected so that, when it is stored, it does not risk folding or piling up on itself under pulley 74 (between pulleys 74 and 76). It is thus avoided for the cable spirals to catch one another and to get tangled. As a specific embodiment, the cable has a given (deployed) length in the range from approximately 4 meters to approximately 9 meters and its spirals are inscribed within a diameter in the range from approximately 4 cm to approximately 8 cm. The relaxed cable has a length in the range from approximately 0.8 meter to approximately 1.5 meters. The cable cross-section is in the range, for example, from approximately 0.5 cm$^2$ to approximately 1.5 cm$^2$.

In the above embodiments, the case of two vertically aligned pulleys 74 and 76 has been illustrated. Although such an alignment is an advantageous embodiment in terms of bulk of the facility, pulleys having shafts vertically shifted with respect to each other may be provided.

Figure 5:
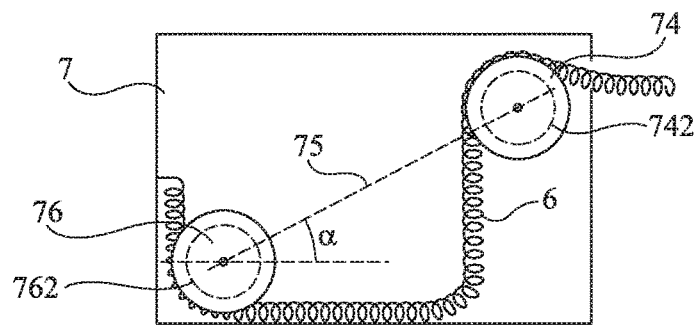
FIG. 5 very schematically shows an alternative embodiment.

FIG. 5 very schematically shows an example according to this variation.

As compared with the forming of FIGS. 2 and 3A to 3C where an imaginary line connecting the shafts of the pulleys is vertical, an imaginary line 75 connecting the horizontal shafts 742 and 762 of pulleys 74 and 76 forms a non-zero angle and non-straight angle relative to the horizontal direction. For example, angle α between line 75 and the horizontal direction has a value in the range from 135° to 0°. An angle smaller than or equal to 90° is preferable so that outlet 78 is close to pulley 74 to avoid a locking of the cable by pressing on the edges of outlet 78 during its handling.

According to another variation of the above embodiments, a single cable guiding pulley is provided. In this case, the "upper" pulley is kept, that is, the cable runs over pulley 74, and then "falls" at the bottom of case 72.

According to another variation, not shown, helical cable 6 is equipped with a spring (in addition to the effect provided by the actual spiral). It may be a spiral spring following the cable pattern, or a metal wire running through the center of the cable spiral and attached on the one hand to socket 62 and on the other hand to a spring-driven cable reel at the other end of the cable. According to another variation, a resilient-type spring made of synthetic material is provided.

According to another embodiment, not shown, a plurality of coaxial "upper" pulleys 74 and a plurality of coaxial "lower" pulleys 76 are provided, the cable successively running from one pulley 74 to one pulley 76 from point 64 to outlet 78. This increases the cable length storable in the device.

Figure 6:
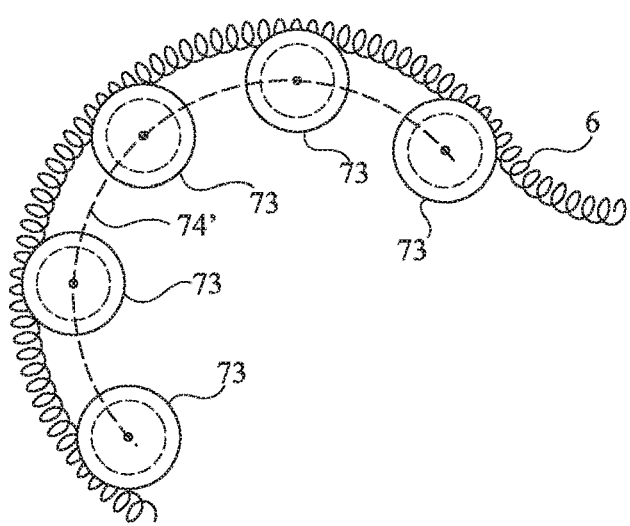
FIG. 6 partially shows a detail of another embodiment.

FIG. 6 shows a detail of another embodiment where pulley 74 is replaced with a plurality of rollers 73 arranged in an arc of a circle 74' to repeat the pattern of the periphery of pulley 74. Due to the path followed by cable 6, it is not necessary to close circle 74'. Such an embodiment provides less inertia effect linked to the mass of pulley 74 but enables to decrease the total weight of the device.

Figure 7:
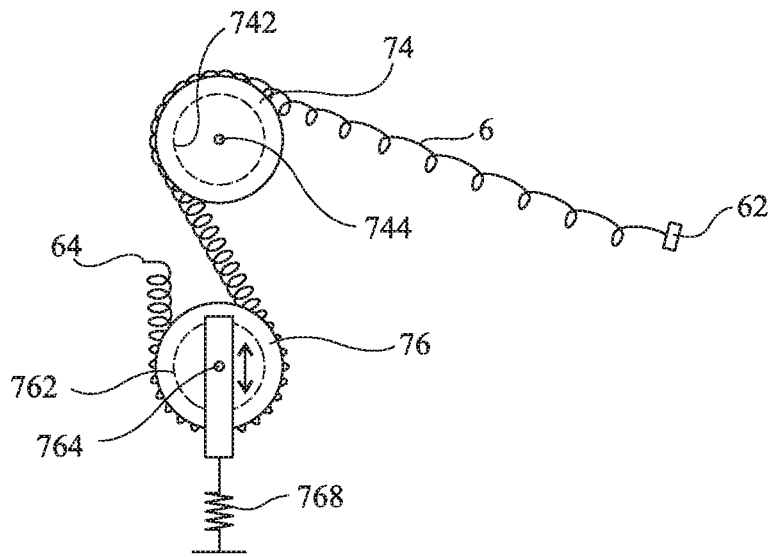
FIG. 7 is a simplified representation of another embodiment.

FIG. 7 schematically shows another embodiment where lower pulley 76 slides vertically, for example, its shaft 762 being mobile in vertical translation in a groove 766 formed in walls of case 72 (not shown in FIG. 7). Thus, when cable 6 is pulled to be taken out of the storage device, pulley 76 rises, which decreases the interval between pulleys 74 and 76, and thus the cable length "lost" inside of the device. When the cable is stored, the weight of pulley 76, possibly assisted by a return spring 768, provides the inwards traction effect.

Figure 8:
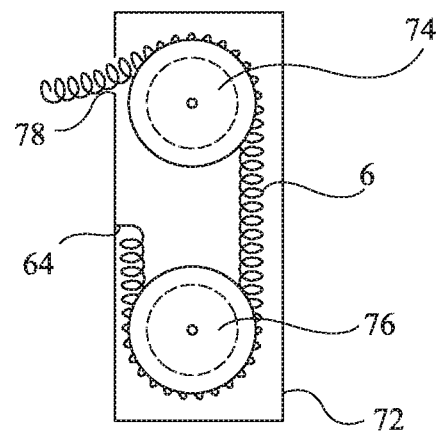
FIG. 8 schematically shows still another embodiment.

FIG. 8 schematically shows still another embodiment where pulleys 74 and 76 rotate in the same direction, the cable then following, within case 72, a C-shaped path rather than an S-shaped path as in the other embodiments. In this example, inlet 64 of cable 6 and outlet 78 are on a same side of case 72.

Figure 9:
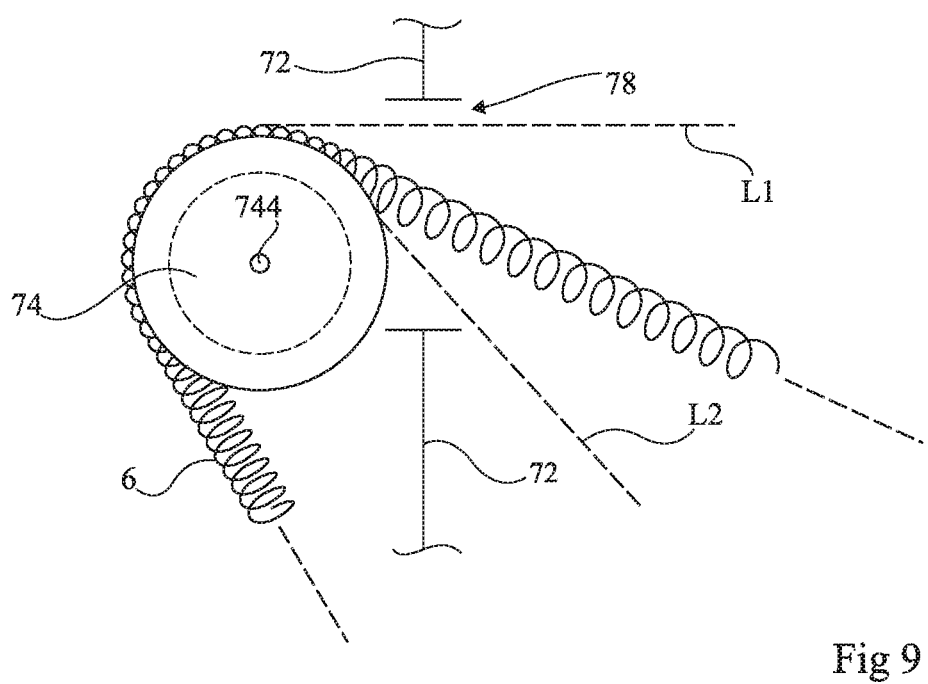
FIG. 9 schematically illustrates an embodiment of an opening of the cable storage device.

FIG. 9 very schematically illustrates an embodiment of opening 78 of case 72 at the level of cable outlet. This drawing only partially shows the system at the level of outlet 78.

According to this embodiment, a sufficiently large opening 78 is provided so that there is no friction of cable against edges of opening 78, whatever the orientation of the cable provided by the user when pulling thereon. In the example of FIG. 9, the vertical amplitude of the cable direction is illustrated by two dotted lines L1 and L2, respectively horizontal and inclined by 45° relative to the horizontal direction. Thus, whatever the orientation of the cable in this 45° angular range, the cable direction is tangential to the pulley during the traction exerted by the user. Frictions are thus avoided, which makes the use easier. In the example of FIG. 9, a horizontal upper limit is provided. However, as a variation, opening 78 is sufficiently large to allow a traction, slightly upwards (for example, with a 20° angle relative to the horizontal direction), with no friction.

According to an embodiment, opening 78 is circular so that the cable can take different orientations in all directions. According to another example, to incite the user to pull on the cable approximately perpendicularly to the shaft of the pulley and thus guarantee that the cable does not come out of the pulley groove, opening 78 is oval in the vertical direction.

Further, the position of the pulley 74 relative to opening 78 is preferably selected so that the pulley is close to the opening and thus to avoid for the cable to fall between the pulley and the case wall comprising the opening. As an example of embodiment, the interval between the pulley and the opening is smaller than the diameter of the coil formed by the retracted cable.

Various embodiments and variations which may be combined have been described. Various alterations, modifications, and improvements will readily occur to those skilled in the art. In particular, the practical implementation of the embodiments which have been described is within the abilities of those skilled in the art based on the functional indications given hereabove. In particular, the dimensions to be given to the different elements of the device are selected, among others, according to the diameter and to the length of cable 6.

What is claimed is:

1. An electric connection system, comprising:
a helical electric cable having a spring effect; and
a cable storage device, defining a cable housing space and comprising at least one first cable guiding pulley, the first pulley being arranged on a horizontal axis and so that, on storage of the cable in the device, the cable is both pulled back by its spring effect and pulled down by the weight of the cable portion present under the first pulley, the cable storage device further comprising a housing defining the cable housing space extending below the first pulley.

2. The system of claim 1, wherein the first pulley is rotatably mobile around an approximately horizontal shaft.

3. The system of claim 1, wherein the first pulley comprises an external peripheral groove having a width, greater than the external diameter of the cable helix.

4. The system of claim 1, wherein the first pulley and/or the storage device pivot around a vertical axis.

5. The system of claim 1, wherein:
a first end of the cable is fixed with respect to the storage device; and
a second end of the cable is flee and comes out of a case of the storage device through an opening approximately tangentially to the first pulley.

6. The system of claim 1, comprising at least one second pulley rotatably mobile around an approximately horizontal shaft, a shaft of the first pulley being higher than the shaft of the second pulley and the pulleys rotating, driven by the cable, in opposite or identical directions.

7. The system of claim 6, wherein:
a first end of the cable is fixed with respect to the storage device; and
a second end of the cable is free and comes out of a case of the storage device through an opening approximately tangentially to the first pulley, and
wherein the vertical position of the fixed end of the cable is between the shafts of the two pulleys.

8. The system of claim 6, wherein the second pulley is approximately vertically mobile in translation.

9. The system of claim 8, wherein a spring pulls the second pulley back downwards.

10. The system of claim 6, comprising a plurality of first pulleys and a plurality of second pulleys, the cable successively running from a first pulley to a second pulley from its first fixed end to the opening.

11. The system of claim 1, wherein the cable has a deployed length in the range from approximately 4 meters to approximately 9 meters and a relaxed length in the range from approximately 0.8 meter to approximately 1.5 meters.

12. The system of claim 1, wherein the cable has a cross-section in the range from approximately, 0.5 cm$^2$ to approximately 1.5 cm$^2$, the diameter of the helix formed by the relaxed cable being in the range from approximately 4 cm to approximately 8 cm.

13. The system of claim 1, intended for the charging of an electric vehicle battery.

* * * * *